United States Patent
Hennig et al.

(10) Patent No.: US 10,562,356 B2
(45) Date of Patent: Feb. 18, 2020

(54) ROTARY UNION FOR TIRE INFLATION SYSTEM

(71) Applicant: Equalaire Systems, Inc., Corpus Christi, TX (US)

(72) Inventors: Mark Kevin Hennig, Corpus Christi, TX (US); James Raymond Snider, Beeville, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 536 days.

(21) Appl. No.: 15/035,695

(22) PCT Filed: Nov. 11, 2014

(86) PCT No.: PCT/US2014/065006
§ 371 (c)(1),
(2) Date: May 10, 2016

(87) PCT Pub. No.: WO2015/070214
PCT Pub. Date: May 14, 2015

(65) Prior Publication Data
US 2016/0288590 A1    Oct. 6, 2016

Related U.S. Application Data

(60) Provisional application No. 61/902,476, filed on Nov. 11, 2013.

(51) Int. Cl.
*B60C 23/00*    (2006.01)
*B60S 5/04*    (2006.01)

(52) U.S. Cl.
CPC .......... *B60C 23/003* (2013.01); *B60C 23/007* (2013.01); *B60C 23/009* (2013.01); *B60S 5/04* (2013.01)

(58) Field of Classification Search
CPC .................................................. B60C 23/003
USPC ........................................................ 152/417
See application file for complete search history.

(56) References Cited

U.S. PATENT DOCUMENTS

| | | | |
|---|---|---|---|
| 839,626 | A | 12/1906 | Nielsen |
| 1,072,907 | A | 9/1913 | Brooks |
| 1,083,847 | A | 1/1914 | McDowell et al. |
| 1,112,596 | A | 10/1914 | Burggraf, Jr. |
| 1,165,057 | A | 12/1915 | Bayly |

(Continued)

FOREIGN PATENT DOCUMENTS

| | | |
|---|---|---|
| CN | 201866444 U | 6/2011 |
| CN | 201897027 U | 7/2011 |

(Continued)

OTHER PUBLICATIONS

International Preliminary Report on Patentability issued in PCT/US2014/061879 dated Apr. 26, 2016 (8 pages).

(Continued)

*Primary Examiner* — Scott A Browne
(74) *Attorney, Agent, or Firm* — Pizarro Allen PC

(57) ABSTRACT

A rotary union having a housing, a shaft rotatably disposed within the housing, and a tube having a first end sealingly disposed within the shaft and a second end sealingly coupled to the housing. A tire inflation system may comprise a rotary union externally mounted to a vehicle wheel end or mounted to a vehicle fairing.

12 Claims, 8 Drawing Sheets

(56) References Cited

U.S. PATENT DOCUMENTS

| | | | |
|---|---|---|---|
| 1,205,504 A | 11/1916 | Bearce | |
| 1,800,780 A | 4/1931 | Daneel | |
| 2,107,405 A | 2/1938 | Williams | |
| 2,168,690 A | 8/1939 | Uksila | |
| 2,177,042 A | 10/1939 | Michael | |
| 2,685,906 A | 8/1954 | Williams | |
| 2,854,018 A | 9/1958 | Kilmarx | |
| 3,276,503 A | 10/1966 | Kilmarx | |
| 3,350,113 A | 10/1967 | Graham | |
| 4,387,931 A | 6/1983 | Bland | |
| 4,641,698 A | 2/1987 | Bitonti | |
| 4,685,501 A | 8/1987 | Williams | |
| 4,700,763 A | 10/1987 | Williams | |
| 4,883,106 A | 11/1989 | Schultz et al. | |
| 5,097,875 A | 3/1992 | Grenie et al. | |
| 5,111,762 A | 5/1992 | Frangiamore | |
| 5,287,906 A | 2/1994 | Stech | |
| 5,377,736 A | 1/1995 | Stech | |
| 5,398,743 A | 3/1995 | Bartos | |
| 5,452,753 A | 9/1995 | Olney | |
| 5,482,358 A | 1/1996 | Kuck | |
| 5,584,949 A | 12/1996 | Ingram | |
| 5,694,969 A | 12/1997 | DeVuyst | |
| 5,707,186 A | 1/1998 | Gobell et al. | |
| 5,769,979 A | 6/1998 | Naedler | |
| 5,868,881 A | 2/1999 | Bradley | |
| 5,947,172 A | 9/1999 | Glotin | |
| 6,105,645 A | 8/2000 | Ingram | |
| 6,131,631 A | 10/2000 | Bradley et al. | |
| 6,145,559 A | 11/2000 | Ingram, II | |
| 6,167,900 B1 | 1/2001 | Laird | |
| 6,269,691 B1 | 8/2001 | Sowatzke et al. | |
| 6,325,123 B1 | 12/2001 | Gao et al. | |
| 6,325,124 B1 | 12/2001 | Colussi et al. | |
| 6,394,556 B1 | 5/2002 | Ingram | |
| 6,401,743 B1 | 6/2002 | Naedler | |
| 6,425,427 B1* | 7/2002 | Stech | B60C 23/003 |
| | | | 152/415 |
| 6,435,238 B1 | 8/2002 | Hennig | |
| 6,484,774 B1 | 11/2002 | Naedler | |
| 6,585,019 B1 | 7/2003 | Ingram | |
| 6,668,888 B1 | 12/2003 | Beesley et al. | |
| 6,698,482 B2 | 3/2004 | Hennig et al. | |
| 6,772,812 B1 | 8/2004 | Hamilton | |
| 6,892,778 B2 | 5/2005 | Hennig et al. | |
| 6,938,658 B2 | 9/2005 | Jarrett et al. | |
| 7,185,688 B2 | 3/2007 | Hayes et al. | |
| 7,191,796 B1 | 3/2007 | Rehmert, Jr. | |
| 7,273,082 B2 | 9/2007 | White et al. | |
| 7,302,979 B2 | 12/2007 | Davison et al. | |
| 7,404,412 B2 | 7/2008 | Milanovich et al. | |
| 7,416,005 B2 | 8/2008 | Hennig et al. | |
| 7,418,989 B2 | 9/2008 | Ingram | |
| 7,530,379 B1 | 5/2009 | Becker et al. | |
| 7,690,412 B1 | 4/2010 | Jenkinson et al. | |
| 7,896,045 B2 | 3/2011 | Solie et al. | |
| 7,963,159 B2 | 6/2011 | Ingram et al. | |
| 7,992,610 B2 | 8/2011 | Collet et al. | |
| 8,028,732 B1* | 10/2011 | Ingram | B60C 23/003 |
| | | | 152/415 |
| 8,191,594 B2 | 6/2012 | Saadat | |
| 8,931,534 B2 | 1/2015 | Eaton et al. | |
| 2002/0124926 A1 | 9/2002 | Colussi et al. | |
| 2003/0071513 A1 | 4/2003 | Elkow | |
| 2004/0000364 A1 | 1/2004 | Hennig et al. | |
| 2004/0173296 A1 | 9/2004 | White et al. | |
| 2005/0161136 A1* | 7/2005 | Hayes | B60C 23/003 |
| | | | 152/415 |
| 2007/0227640 A1 | 10/2007 | Ingram | |
| 2008/0185086 A1 | 8/2008 | Ingram et al. | |
| 2009/0266460 A1 | 10/2009 | Resare et al. | |
| 2009/0283190 A1 | 11/2009 | Padula et al. | |
| 2012/0024445 A1 | 2/2012 | Wilson et al. | |
| 2013/0087262 A1 | 4/2013 | Hennig | |
| 2013/0306192 A1 | 11/2013 | Hennig | |
| 2014/0261941 A1* | 9/2014 | Knapke | B60C 23/003 |
| | | | 152/417 |
| 2015/0275882 A1 | 10/2015 | Joyce et al. | |
| 2016/0250901 A1 | 9/2016 | Hennig | |

FOREIGN PATENT DOCUMENTS

| | | |
|---|---|---|
| CN | 203099164 U | 7/2013 |
| CN | 103282655 A | 9/2013 |
| CN | 203258246 U | 10/2013 |
| EP | 2535208 A1 | 12/2012 |
| GB | 492510 A | 9/1938 |
| WO | WO9624498 A1 | 8/1996 |
| WO | 2011163274 | 12/2011 |
| WO | 2012027335 A1 | 3/2012 |

OTHER PUBLICATIONS

Notification of the First Office Action issued in Chinese Patent Application No. 201480058059.4 dated Dec. 26, 2016 (20 pages).
Communication of the extended European search report and search opinion issued in European Patent Application No. 14856099.8 dated Feb. 24, 2017 (7 pages).
Patent Examination Report No. 1 issued in Australian Patent Application No. 2014340018 dated Oct. 19, 2016 (4 pages).
Opening Markman Brief (U.S. Pat. No. 5,769,979) of Pressure Systems International, Inc. and Equalaire, Inc., filed in *Airgo IP, LLC v. Arvinmeritor, Inc. et al.*, United States District Court for the Western District of Oklahoma, Case No. 05-CV-01405, Nov. 6, 2006 (28 pages).
Plaintiffs Airgo IP, LLC, and Airgo Systems, LLC Opening Claim Construction Brief, filed in *Airgo IP, LLC v. Arvinmeritor, Inc. et al.*, United States District Court for the Western District of Oklahoma, Case No. 05-CV-01405, Nov. 6, 2006 (41 pages).
Plaintiffs Airgo IP, LLC, and Airgo Systems, LLC Response to Counter-Plaintiffs Pressure Systems International, Inc., and Equalaire Systems, Inc. Opening Claim Construction Brief, filed in *Airgo IP, LLC v. Arvinmeritor, Inc. et al.*, United States District Court for the Western District of Oklahoma, Case No. 05-CV-01405, Nov. 27, 2006 (28 pages).
Response of Defendants/Counter-Plaintiffs Arvinmeritor, Inc., Pressure Systems International, Inc. and Equalaire, Inc. to Plaintiffs/ Counter-Defendants Airgo IP, LLC, and Airgo Systems, LLC's Opening Claim Construction Brief, filed in *Airgo IP, LLC v. Arvinmeritor, Inc. et al.*, United States District Court for the Western District of Oklahoma, Case No. 05-CV-01405, Nov. 27, 2006 (31 pages).
Order (Markman Ruling) filed in *Airgo IP, LLC v. Arvinmeritor, Inc. et al.*, United States District Court for the Western District of Oklahoma, Case No. 05-CV-01405, Feb. 23, 2007 (18 pages).
International Preliminary Report on Patentability issued in PCT App. Serial No. PCT/US2011/041305 dated Feb. 20, 2014 (5 pages).
International Search Report and Written Opinion issued in PCT Patent App. No. PCT/US11/48760 dated Feb. 26, 2013 (9 pages).
International Preliminary Report on Patentability issued in PCT Patent App. No. PCT/US11/48760 dated Feb. 2, 2012 (8 pages).
Patent Examination Report No. 1 issued in Australian Patent Application No. 2014346426 dated Nov. 25, 2016 (4 pages).
Office Action issued by the Chinese Patent Office for Chinese Application for Invention No. 201480061582.2 dated May 15, 2017 (14 pages).
European Extended Search Report issued by the European Patent Office for European Patent Application No. 14859439.3 dated May 23, 2017 (7 pages).
Examination Report No. 2 issued by the Australian Patent Office for Australian Patent Application No. 2014346426 dated Jul. 5, 2017 (4 pages).
Google Patents English translation of CN201866444U downloaded Aug. 15, 2017 (7 pages).
Google Patents English translation of CN103282655A downloaded Aug. 15, 2017 (14 pages).

(56) References Cited

OTHER PUBLICATIONS

Google Patents English translation of CN201897027U downloaded Aug. 15, 2017 (6 pages).
Google Patents English translation of CN203099164U downloaded Aug. 15, 2017 (8 pages).
Google Patents English translation of CN203258246U downloaded Aug. 15, 2017 (5 pages).

* cited by examiner

ROTARY UNION FOR TIRE INFLATION SYSTEM

CROSS-REFERENCE TO RELATED APPLICATIONS

This application claims priority to International Application No. PCT/US2014/065006 filed Nov. 11, 2014, which claims priority to U.S. Provisional Patent Application No. 61/902,476, entitled "External Rotary Union For Tire Inflation System" filed on Nov. 11, 2013, the entire disclosures of which are hereby entirely incorporated by reference.

FIELD

This application relates generally to vehicle automatic tire inflation systems.

BACKGROUND

Automatic tire inflation systems may be used to control vehicle tire pressure by adding fluid to the vehicle's tires. Automatic tire inflation systems may provide pressurized fluid from a pressurized fluid source to the vehicle's tires to maintain tire pressure at a desired pressure level whether the tires are stationary or rotating. Automatic tire inflation systems may use a variety of regulators, fluid conduits and rotary fluid connections to provide pressurized fluid to the tires. Automatic tire inflation systems may also use one or more valves to control the direction, speed and volume of fluid flow.

Automatic tire inflation systems may provide air to a tire through conduits located internally to vehicle structures, such as rotary unions mounted at an end of a sealed axle. Automatic tire inflation systems may also provide air through conduits located externally to vehicle structures, such as rotary unions mounted to brackets affixed to a vehicle.

The disclosed subject matter provides a rotary union suitable for an externally-routed automatic tire inflation system application.

SUMMARY

A rotary union may comprise a housing, a shaft rotatably disposed within the housing, a tee body removably and non-rotatably coupled to the housing, and a tubular member having a first end sealingly disposed in the shaft and a second end sealingly disposed in the tee body. A rotary union may further comprise a radial bushing or bearings disposed within the housing about the shaft, and a thrust bushing or thrust bearings disposed between a first end of the shaft and an interior surface of the housing. A rotary union may further comprise a first annular seal disposed between the shaft and the first end of the tubular member, and a second annular seal disposed between the tee body and the second end of the tubular member. The annular seals may comprise lip seals or o-rings. The tubular member may be rotatable with respect to either or both of the shaft and tee body.

A rotary union housing may further comprise a vent hole. A rotary union may further comprise a seal closing the vent hole and configured to allow pressurized fluid to escape the rotary union if one or both of the first annular seal and the second annular seal fail. A rotary union may further comprise an annular seal disposed within the housing about the shaft adjacent the radial bushing or bearing, and a shield disposed about the shaft adjacent the housing so as to shield the annular seal from environmental hazards. A rotary union may further comprise at least one hose fitting.

A rotary union may comprise a housing, a shaft rotatably disposed within the housing, and a tube having a first end sealingly disposed within the shaft and a second end sealingly coupled to the housing, the tube being rotatable with respect to either or both of the shaft and housing.

A vehicle tire inflation system may comprise a fluid pressure source, and a rotary union mounted to a vehicle fairing, the rotary union being in sealed fluid communication with the fluid pressure source and one or more vehicle tires.

DETAILED DESCRIPTION

Figure 1:
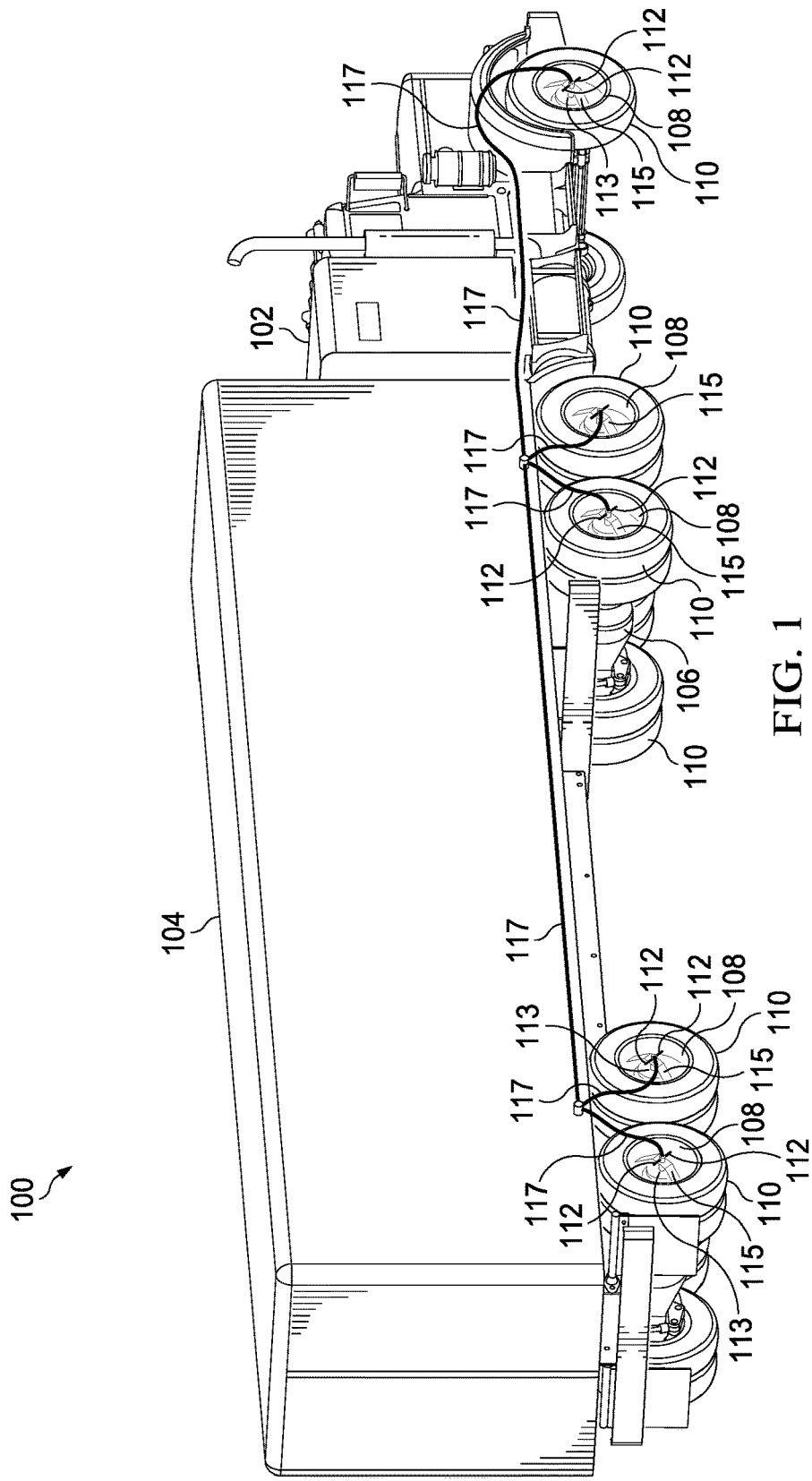
FIG. 1 illustrates an embodiment of a vehicle having an automatic tire inflation system.

As may be seen in FIG. 1, a vehicle 100 may comprise a truck 102 and a trailer 104. The truck 102 may include one or more drive axles 106 as part of the vehicle's powertrain. The truck 102 may further include a steer axle (not shown in detail) having pivotable spindles that may provide steering capability for the vehicle 100. The trailer 104 may include one or more fixed axles (not shown). Each axle may have one or more wheels 108 mounted thereto. A pneumatic tire 110 may be mounted to each wheel 108.

The vehicle 100 may be provided with an automatic tire inflation system (ATIS) (such as is shown in more detail in FIG. 2) that may use pressurized fluid from the vehicle's fluid brake system, and/or some other source of pressurized air or other gas to maintain the tires at a desired fluid pressure. The ATIS may be used to control the fluid pressure in one or more of the tires 110 mounted to the steer (not shown), drive 106 and/or trailer axles (not shown). The ATIS may include one or more hoses 112 in fluid communication with each tire 110 for communicating pressurizing fluid from the pressure source to and from one or more of the tires 110. The pressurizing fluid may comprise air, pure nitrogen, some other inert gas, or any mixture thereof.

The ATIS may provide fluid to the hoses 112 through a rotary union 113 mounted to a bracket 115 affixed to the wheel 108. The rotary union 113 may receive fluid through one or more conduits 117 mounted externally to the vehicle.

Figure 2:
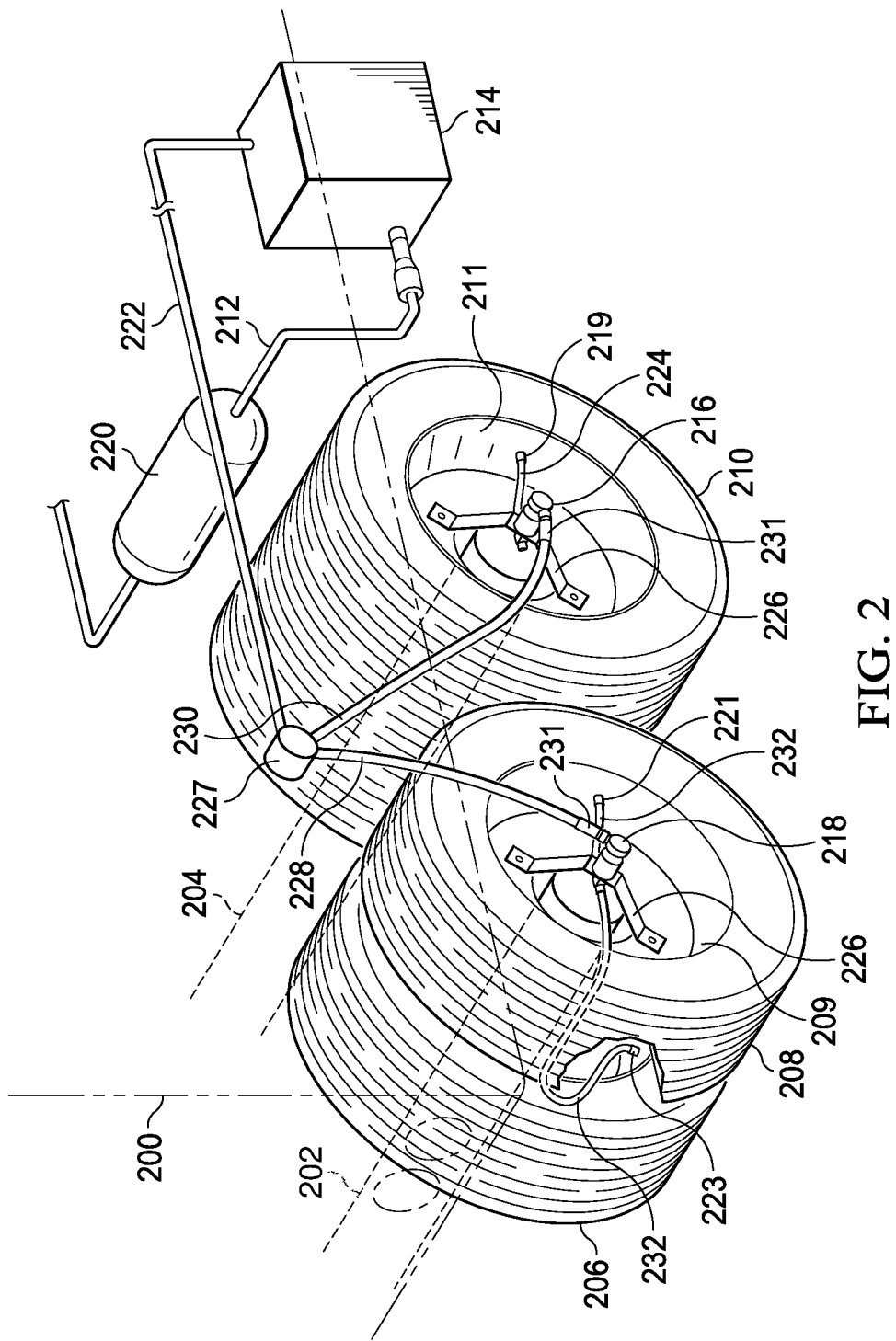
FIG. 2 illustrates an embodiment of an automatic tire inflation system comprising an external rotary union.

FIG. 2 illustrates in more detail multiple embodiments of an exemplary automatic tire inflation system. A trailer 200 may include two axles 202, 204. Some trailers 200 may have dual tires 206, 208 mounted to wheels 209, 211 at each end of the axles 202, 204, as may be seen with respect to axle 202. Other trailers 200 may have a single tire 210, such as a super-single tire or a wide-base tire, mounted at each end of the axles 202, 204, as may be seen with respect to axle 204. Wide-base tires may include those manufactured, for example, by Michelin, Toyo, Goodyear, Bridgestone and other tire manufacturers. The ATIS may generally include an air pressure regulator (not shown), which may be mounted in a control box 214.

The ATIS may include one or more rotary fluid connections or rotary unions 216, 218 mounted to brackets 226. The brackets 226 may be coupled to the wheels 209, 211, and may rotate with the wheels 209, 211. The air pressure regulator may receive pressurized air from an air pressure source 220 through a conduit 212. The air pressure source 220 may comprise, for example, a vehicle air brake system air supply. Pressurized fluid may flow from the fluid pressure regulator and through conduit 222 to the hoses 228, 230. From there, the fluid may flow through hoses 228, 230 to rotary connections 216, 218 to hoses 224, 232 to valves 219, 221, 223 connected to tires 208, 210, 206, respectively.

Hoses 228, 230 may comprise flexible conduits each threadably attachable at one end to a manifold 227, and threadably attachable at the respective other end to rotary connections 216 and 218, respectively. The hose end attachable to the manifold 227 may comprise a one-way check valve, such as a Schraeder valve, that allows fluid to flow to the tires, but not in the reverse direction. Hoses 228, 230 may further comprise a metallic tubular sheath (not shown) disposed about the flexible conduit for abrasion resistance. The metallic tubular sheath may be crimped to the flexible conduit at one end to substantially prevent translation of the flexible conduit within the sheath. A strain relief 231 may be disposed about each hose 228 and 230 to prevent the hose from kinking. The manifold 227 and hoses 228, 230 may be disposed about the exterior of the vehicle. The hoses 228, 230 may, for example, be approximately 1"-2" away from a tire when coupled to the manifold 227 and a rotary connection 216, 218.

Figure 3:
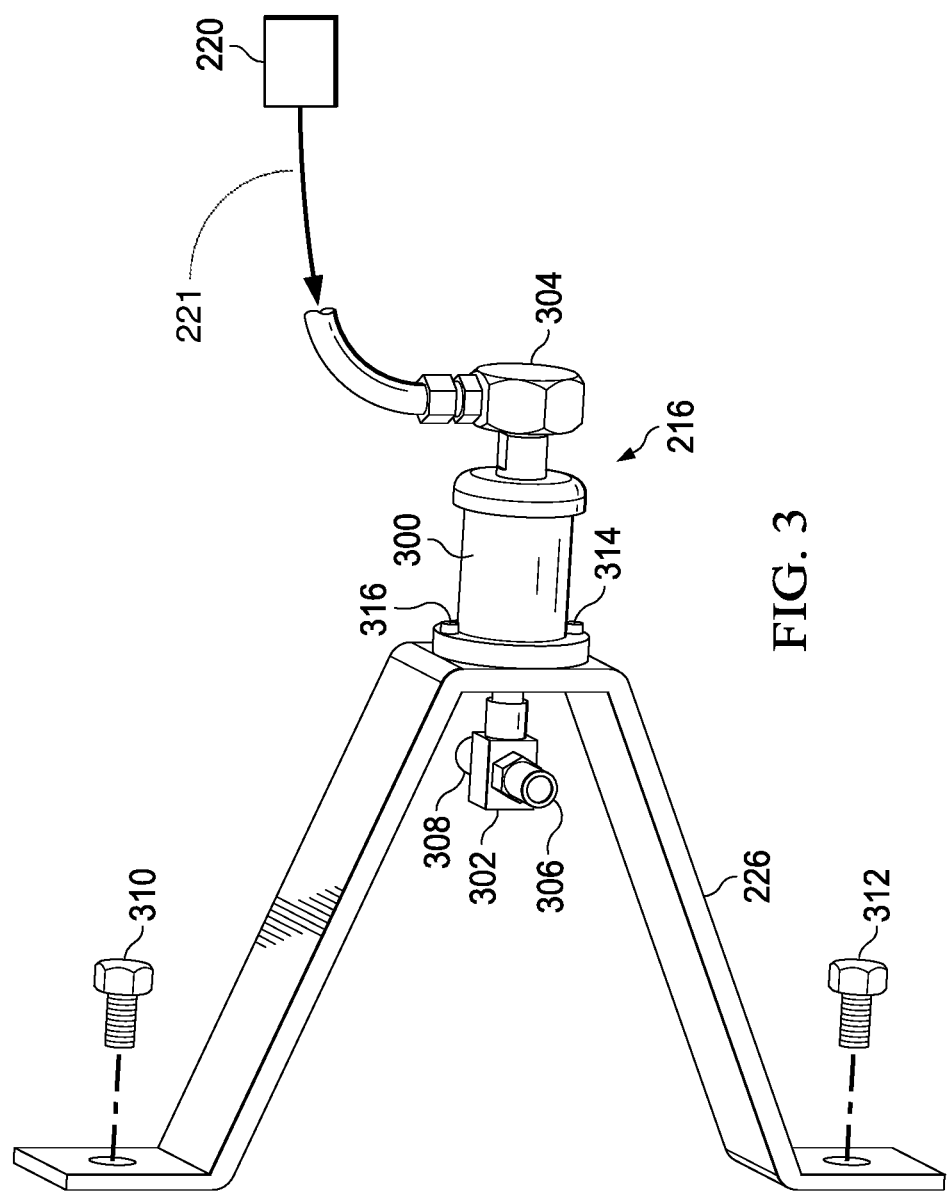
FIG. 3 illustrates an embodiment of a rotary fluid connection mounted to a vehicle fairing.

FIG. 3 illustrates one embodiment of a rotary connection 216 mounted to bracket 226 by any suitable fastener, such as bolts 314, 316. The bracket 226 may be mounted to a wheel or fairing by any suitable fastener, such as by bolts 310, 312. The rotary connection 216 may comprise a rotary union 300, a tee 302 coupled to the rotary union, and a hose connection 304 coupled to the rotary union. The tee 302 and hose connection 304 may be coupled to the rotary union by screw threads or any other suitable means. Tire-pressurizing fluid may flow 221 from the pressure source 220 through the hose connection 304 into the rotary union. The fluid may flow from the rotary union through the tee 302, and from the tee to the tires through hoses (not shown) coupled from the tires to the tee fittings 306, 308.

Figure 4A:
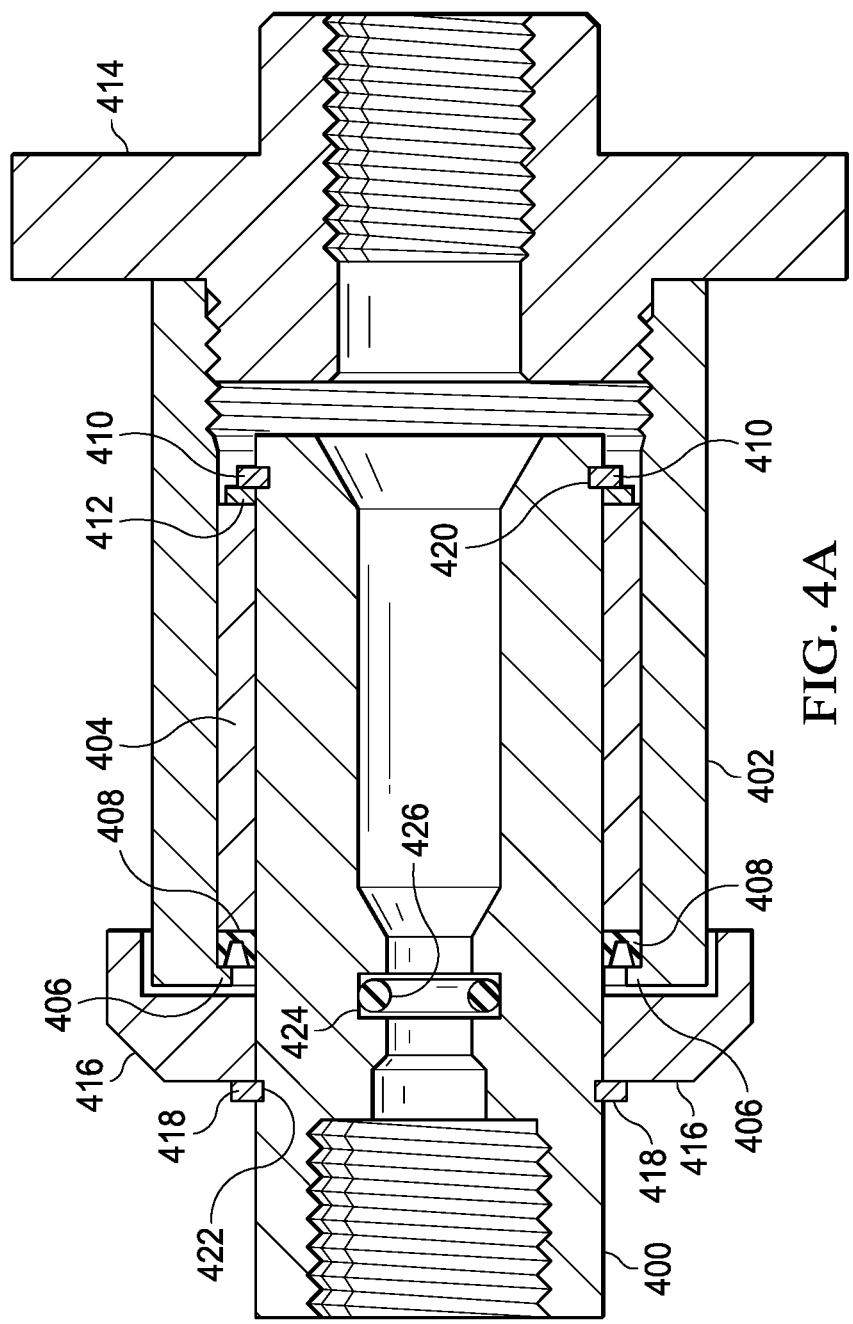
FIGS. 4A and 4B illustrate an embodiment of a rotary union.
Figure 4B:
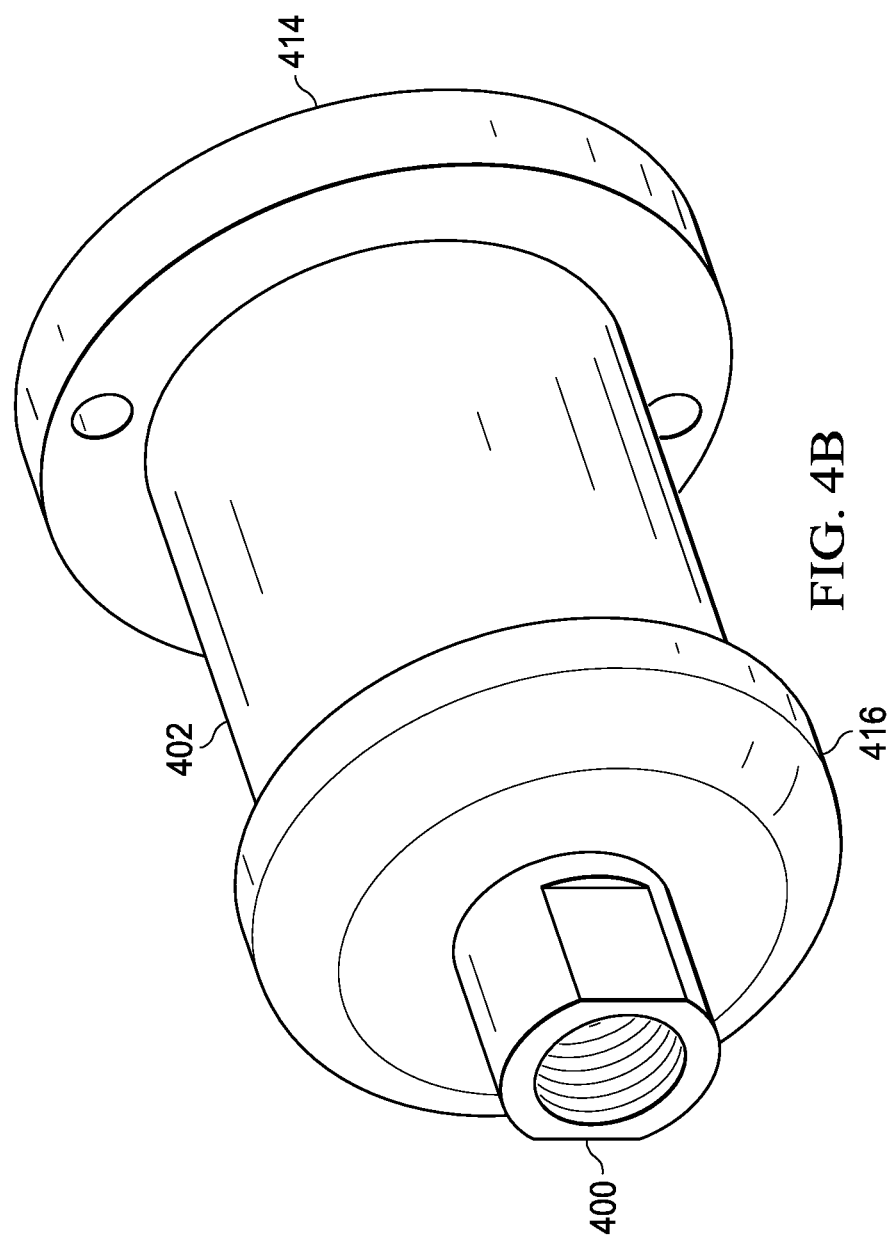

FIG. 4A illustrates the rotary union of FIG. 3 in more detail. As may be seen in FIG. 4A, the rotary union may comprise a shaft 400 disposed within a housing 402 (as more clearly illustrated in FIG. 4B). A radial bushing 404 may be disposed between the shaft 400 and the housing 402. The bushing 404 may comprise an oil-impregnated material, such as oilite bronze alloy, or PTFE, nylon, or any other suitable wear-resistant material with a relatively low coefficient of friction. In other embodiments, roller or ball bearings may be used in place of a bushing. The housing 402 may comprise a lip 406 which may help retain the bushing 404 within the housing 402. In some embodiments, an annular seal 408 may be disposed between the lip 406 and the bushing 404. In some embodiments, the annular seal 408 may comprise a lip seal.

In some embodiments, the shaft 400 may be restrained from translating within the bushing 404 (or bearing) by placement of a retaining ring 410 disposed about the shaft 400. A washer 412 may be disposed between the bushing 404 and the retaining ring 410.

In some embodiments, an end cap 414 may be coupled to the housing 402, e.g., by screw threads. In other embodiments, the housing 402 and end cap 414 may comprise a unitary item of manufacture. A splash shield 416 may be disposed about the shaft 400 against the lip 406 end of the housing 402 to shield the annular seal 408 from debris, high-volume or high-velocity liquid flow and other environmental hazards. In some embodiments, a washer 416 may be disposed between the splash shield 416 and the end of the housing 402. A retaining ring 418 may be used to prevent the splash shield 416 from sliding off of the shaft 400.

In some embodiments, the shaft 400 may be generally cylindrical, and may be machined or molded, for example, from steel or polycarbonate. Grooves 420 and 422 may be provided in some embodiments to allow retaining rings 410 and 418 to be seated circumferentially about the shaft 400. In an interior dimension of the shaft 400, a groove 424 may be provided in which an annular seal 426, such as an o-ring, may be disposed.

Figure 5:
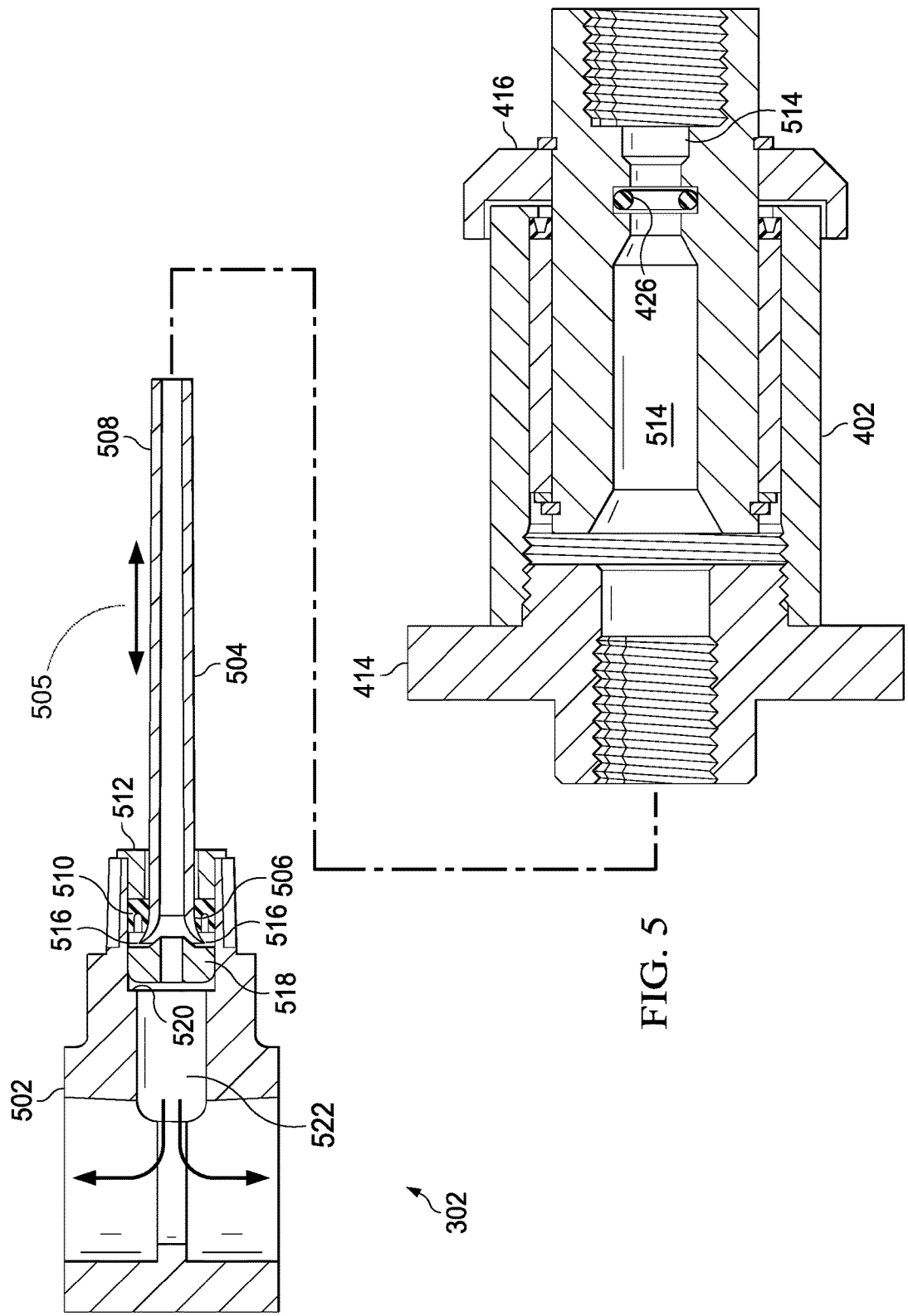
FIG. 5 illustrates an embodiment of a rotary union and tee.

FIG. 5 shows an embodiment of a tee 302. In some embodiments, a tee 302 may comprise a tee body 502 and an elongated tubular member 504, preferably metal, having a first end 506 and a second end 508, all as more particularly described in U.S. Pat. No. 6,698,482 entitled "Rotary Air Connection with Bearing for Tire Inflation System," the disclosure of which is hereby wholly incorporated by reference. In other embodiments, the tee 302 may comprise the rotary air connection as described in U.S. Pat. No. 5,769,979 entitled "Rotary Air Connection for Tire Inflation System," the disclosure of which is hereby wholly incorporated by reference.

The first end 506 of the tubular member 504 is sealably connected to the tee body 502 by an annular seal 510. The seal 510 may be of any suitable dynamic seal allowing axial and rotational movement of the end 506, such as a lip seal or O-ring seal, and is held in place by the telescope cap 512. A tee body 502 may be threadably coupled to the end cap 414 for connection to the tire or tires at the end of the axle 12. The tee body 502 may thus be removably and non-rotatably coupled to the end cap 414. When the tee body 502 is threaded to the endcap 414, the end 508 of the tubular member 504 extends into and sealingly engages an annular seal 426, thus compensating for any misalignment or translation of the shaft 400 within the housing 402. That is, the second end 508 is coaxially extendable through and is longitudinally and rotationally movable in the passageway 514 and sealably engages an annular seal 426. The passageway 514 is in communication with a fluid supply conduit (not shown). A first resilient annular seal 426 is supported in the passageway 514 and encircles the passageway 514. The annular seals may comprise any suitable seal, such as a lip seal or O-ring, and may comprise any suitable material, such as nitrile, silicon or rubber. Tire pressurizing fluid may thus be communicated 505 through the shaft passageway 514, the tubular member 504, and the tee body 502 (through channel 522). The tubular member may be rigid or flexible, or comprise both rigid and flexible portions.

The end 506 of the tubular member 504 may include a shoulder 516 which, in commercial use, may be a convex flange. A bearing 518 may co-act with the shoulder 516, limiting the longitudinal or axial movement of the tubular member 504 and preventing the shoulder 516 from engaging the internal flange 520 on the air connection or tee body 502.

In some embodiments, the end cap 414 may be omitted, and a tee 302 may be coupled directly to the housing 300, such as by screw threads.

Figure 6:
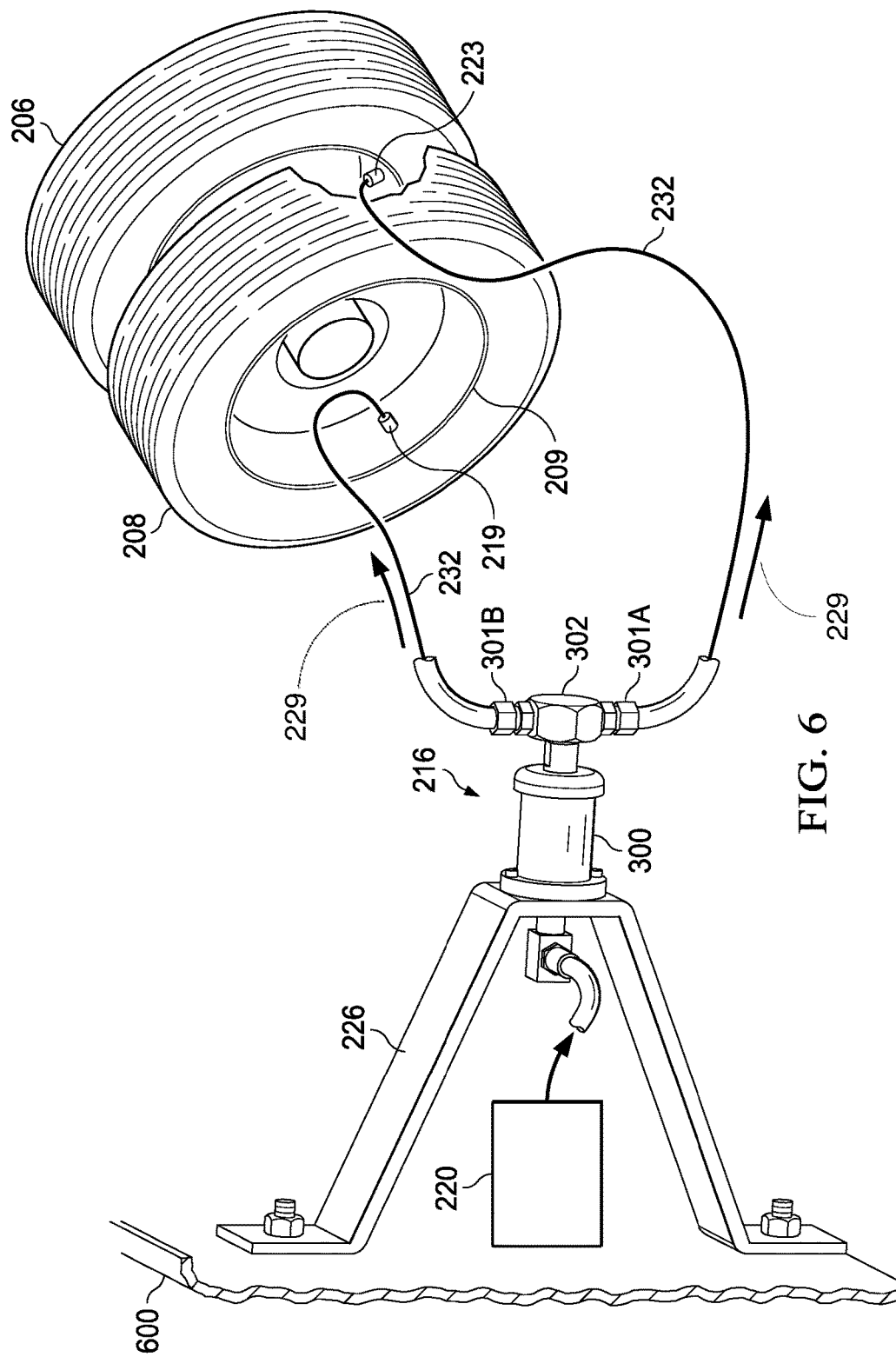
FIG. 6 illustrates an embodiment of a rotary fluid connection.

In some embodiments, a bracket 226 may be mounted to a vehicle fairing, which should be understood to include any aerodynamic vehicle fairing, skirt, trim, fender, aerodynamic wheel cover, or shroud situated on or over the wheel end, as shown in the embodiment of FIG. 6. Such fairings 600 may be provided, for example, to cover part of a tire 208 to increase aerodynamic efficiency, to protect the wheel end, or for ornamental purposes. A fairing 600 may cover the outboard side of all or part of a tire 208 mounted to a drive axle, steer axle or trailer axle. Of course, any other suitable external ATIS or rotary union may be mounted to a fairing 600. In the embodiment of FIG. 6, the bracket 226 may be non-rotatably mounted to a fairing 600. Any other suitable mounting structure may be used to mount an external rotary union to the wheel-facing side of a fairing, not just a bracket as shown in FIG. 3. Externally-disposed fluid conduits (such as one or more of conduits 222, 228 and 230 of FIG. 2) may be similarly mounted to a fairing to communicate fluid to the rotary connection 216.

The rotary connection 216 may accommodate tire rotation in a variety of ways. If a bracket 216 is mounted to a wheel, then the bracket will rotate with the wheel. Accordingly, the housing, end cap and tee 302 may rotate with the wheel as well. The rotary union shaft may remain substantially rotationally stationary. Referring to the embodiment of FIG. 5, the tubular member 504 may be capable of rotation in either or both of the annular sealing members 510 and 426. One or the other of seals 510 and 426 may fix the tubular member 504 against rotation.

In the embodiment of FIG. 6, a bracket 226 may be mounted to a fairing 600. In such an embodiment, the hose connection 302 may include one or more hose attachment points and will rotate with the wheel. In the embodiment of FIG. 6, dual tires 206, 208 may be seen, for which two hose attachment points 301A and 301B may be provided in the hose connection 302 to allow sealed fluid communication 229 with the tires 206, 208 through hoses 232. Single-wide tires may require only a single hose attachment point in the hose connection tee 302. That is, tee 302 may comprise one or more hose attachment fittings. Accordingly, the housing, end cap and tee 302 may remain rotationally stationary as well. The rotary union shaft and hose connection 302 may rotate as the wheel rotates. Referring to the embodiment of FIG. 5, the tubular member 504 may be capable of rotation in either or both of the annular sealing members 510 and 426.

Figure 7:
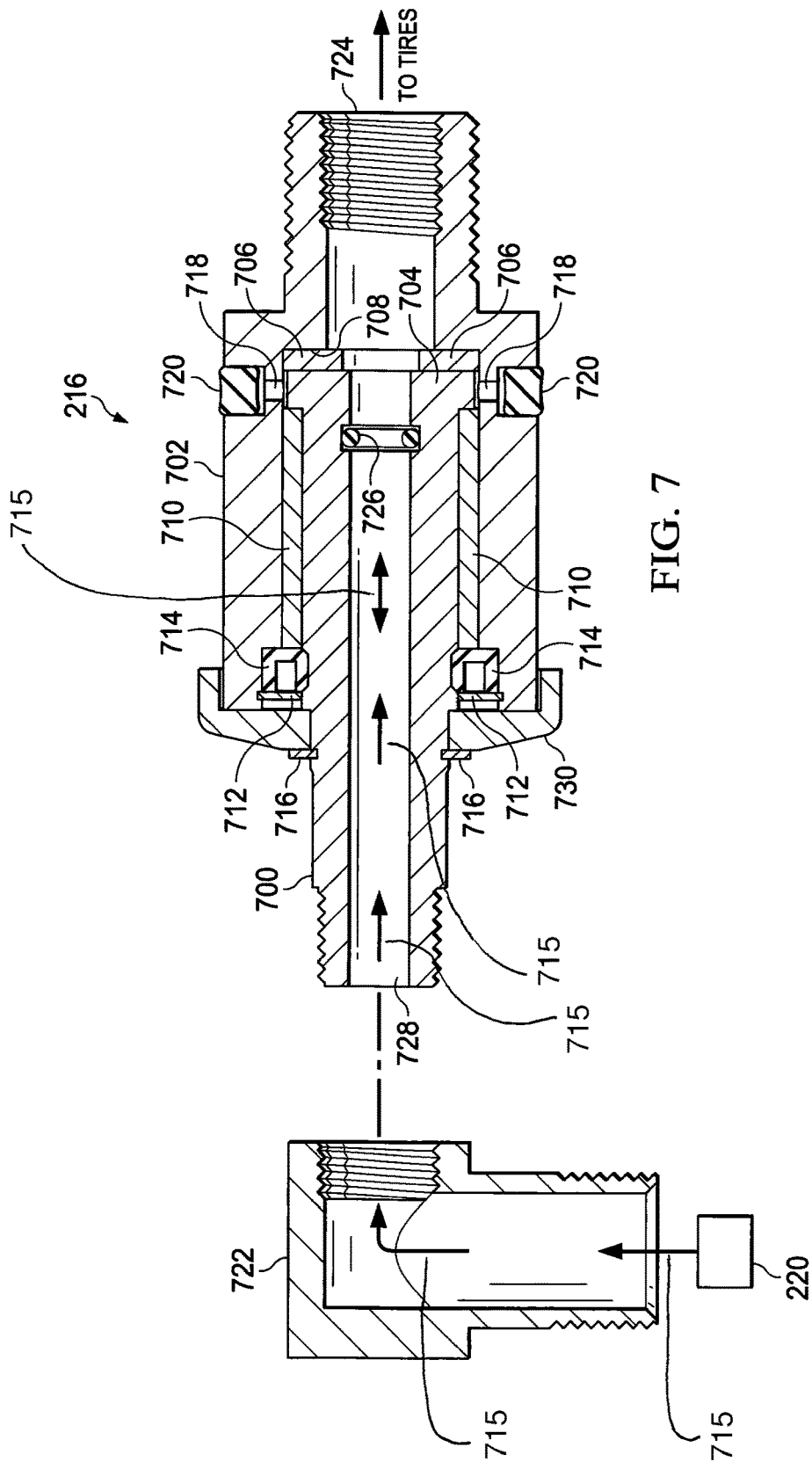
FIG. 7 illustrates an embodiment of a rotary union fluid connection.

FIG. 7 illustrates another embodiment of a rotary union 216. A shaft 700 may be rotatably disposed within a housing 702. A thrust washer 706 may be disposed between a first end 704 of the shaft 700 and a shoulder 708 in the interior of the housing 702. The thrust washer 706 may comprise an oil-impregnated material, such as oilite bronze alloy, or PTFE, nylon, or any other suitable wear-resistant material with a relatively low coefficient of friction. In other embodiments, a thrust roller or ball bearing may be used in place of the thrust washer 706.

A radial bushing 710 may be disposed in the housing 702 about the shaft 700. The radial bushing 710 may comprise an oil-impregnated material, such as oilite bronze alloy, or PTFE, nylon, or any other suitable wear-resistant material with a relatively low coefficient of friction. In other embodiments, a roller or ball bearing may be used in place of the radial bushing. A snap ring or retainer clip 712 may be disposed about the inner diameter of the housing 702 so as to retain the shaft 700 and radial bushing 710 within the housing 702. In some embodiments, an annular seal 714, such as a lip seal, may be disposed between the inner diameter of the housing 702 and the outer diameter of the shaft 700 so as to provide a substantially sealing interface between the housing 702 and the shaft 700. A splash shield 730 may be disposed about the shaft 700 against the housing 702, and may be held in place by a retaining ring 716 disposed about the outer diameter of the shaft 700.

The housing 702 may be provided with one or more vent holes 718 to allow pressurized air to escape from the rotary union 216 in the event of seal failure (such as failure of annular seal 510 (shown in FIG. 5) or of annular seal 426 (shown in FIG. 5) or annular seal 726 (shown in FIG. 7)). An annular seal 720, such as an o-ring having a square cross section, may be elastically disposed about the housing over the vent holes 718 so as to prevent air, moisture or debris from entering the rotary union through the vent holes 718. Any other suitable seal may be used to seal the vent hole against such ingress, such as a check valve, duckbill valve, flexible diaphragm or rubber band.

In some embodiments, a hose fitting 722 may be threadably coupled to the shaft 700 to better allow for attachment of a fluid conduit carrying pressurized fluid 715 from the pressure source 220. A tee (not shown), such as tee 302 of FIG. 5, may be threaded into the housing 702 at outlet 724. The tubular member (such as 504) of the tee may be disposed within an annular seal 726 disposed within the fluid channel 728, as described in connection with FIG. 5, so as to allow fluid flow 715.

In yet further embodiments, a housing 702 may comprise a tee body 502, annual seal 510 and tubular member 504 (with reference to parts shown in FIG. 5). That is, the tee body need not be separable from the housing. Other components disclosed herein may comprise separate portions, or may comprise one or more unitary items of manufacture.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of fluid pressure. Accordingly, the appended claims are intended to include within their scope such processes, machines, manufacture, compositions of matter, means, methods, systems or steps.

We claim:
1. A rotary union for communicating pressurized fluid to and from at least one tire of a wheel end rotatably mounted to an axle of a vehicle, the rotary union comprising:
   a housing;
   a shaft rotatably disposed within the housing;
   a tee body removably and non-rotatably coupled to the housing so as to be non-rotatable with respect to the housing when the wheel end rotates with respect to the axle;

a tubular member having a first end sealingly disposed in the shaft and a second end sealingly disposed in the tee body, the tubular member configured to provide sealed fluid communication between the shaft and the tee body;

the entire rotary union being configured to be disposed of and mounted externally to the wheel end and to receive the pressurized fluid from a pressure source provided externally to the vehicle wheel end and to communicate the pressurized fluid sequentially through the shaft and the tubular member and the tee body or reversely through the tee body, the tubular member and through the shaft.

2. The rotary union of claim 1, further comprising:
a radial bushing or radial bearing disposed within the housing about the shaft; and
a thrust bushing or thrust bearing disposed between a first end of the shaft and an interior surface of the housing.

3. The rotary union of claim 1, further comprising a first annular seal disposed between the shaft and the first end of the tubular member; and a second annular seal disposed between the tee body and the second end of the tubular member.

4. The rotary union of claim 3, wherein the housing further comprises a vent hole.

5. The rotary union of claim 3, wherein the first annular seal and the second annular seal each comprise either an o-ring or a lip seal.

6. The rotary union of claim 4, further comprising a seal closing the vent hole and configured to allow pressurized fluid to escape the rotary union if one or both of the first annular seal and the second annular seal fail.

7. The rotary union of claim 2, further comprising:
an annular seal disposed within the housing about the shaft adjacent the radial bushing or bearing; and
a shield disposed about the shaft adjacent the housing so as to shield the annular seal from environmental hazards.

8. The rotary union of claim 1, wherein the tee body further comprises at least one hose fitting.

9. The rotary union of claim 1, wherein the tubular member is rotatable with respect to either or both of the shaft and tee body when the wheel end rotates with respect to the axle.

10. The rotary union of claim 1, the rotary union configured for mounting to a bracket attached to the wheel end.

11. The rotary union of claim 1, the rotary union configured for mounting to a fairing attached to the vehicle near the wheel end.

12. A rotary union being configured to communicate pressurized fluid to and from at least one tire of a wheel end rotatably mounted to an axle of a vehicle, the rotary union comprising:
a housing;
a shaft rotatably disposed within the housing; and
a tube having a first end sealingly disposed within the shaft and a second end sealingly coupled to the housing, the tube being rotatable with respect to either or both of the shaft and housing when the wheel end rotates with respect to the axle,
wherein the entire rotary union being configured to be disposed of and mounted externally to the wheel end and to receive the pressurized fluid from a pressure source provided externally to the vehicle wheel end and to communicate the pressurized fluid sequentially through the shaft and the tube or reversely from the tube and through the shaft.

* * * * *

UNITED STATES PATENT AND TRADEMARK OFFICE
CERTIFICATE OF CORRECTION

PATENT NO. : 10,562,356 B2
APPLICATION NO. : 15/035695
DATED : February 18, 2020
INVENTOR(S) : Mark Kevin Hennig and James Raymond Snider Page 1 of 1

It is certified that error appears in the above-identified patent and that said Letters Patent is hereby corrected as shown below:

In the Drawings

Sheet 3 of 8, Fig. 3, -221- should be changed to --225--.

In the Specification

Column 3, Line 21, -Schraeder- should be changed to --Schrader--.

Column 3, Line 43, -flow 221- should be changed to --flow 225--.

Column 4, Line 8, -washer 416 may- should be changed to --washer may--.

Column 4, Lines 39-40, -axle 12.- should be changed to --axle.--.

Column 7, Line 42, -endcap- should be changed to --end cap--.

Column 4, Line 66, -housing 300- should be changed to --housing 402--.

Column 5, Line 21, -bracket 216- should be changed to --bracket 226--.

Column 5, Lines 36-37, -communication 229 with- should be changed to --communication with--.

Column 6, Line 27, -fluid flow 715- should be changed to --fluid 715 flow--.

Signed and Sealed this
Third Day of November, 2020

Andrei Iancu
*Director of the United States Patent and Trademark Office*